(12) United States Patent
Trail

(10) Patent No.: US 10,268,268 B1
(45) Date of Patent: Apr. 23, 2019

(54) WAVEGUIDE INTEGRATED EYE TRACKING

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/639,565

(22) Filed: Jun. 30, 2017

Related U.S. Application Data

(60) Provisional application No. 62/383,031, filed on Sep. 2, 2016.

(51) Int. Cl.
| | |
|---|---|
| *G06F 3/01* | (2006.01) |
| *G02B 27/00* | (2006.01) |
| *H04N 5/225* | (2006.01) |
| *F21V 8/00* | (2006.01) |
| *G02F 1/29* | (2006.01) |

(52) U.S. Cl.
CPC .......... *G06F 3/013* (2013.01); *G02B 6/0035* (2013.01); *G02B 27/0093* (2013.01); *G02F 1/292* (2013.01); *H04N 5/2256* (2013.01)

(58) Field of Classification Search
CPC ....... G06F 3/013; G02F 1/292; G02B 6/0035; G02B 27/0093; H04N 5/2256
See application file for complete search history.

(56) References Cited

U.S. PATENT DOCUMENTS

| | | | | |
|---|---|---|---|---|
| 8,878,749 B1* | 11/2014 | Wu | .................. | G01S 17/06 345/8 |
| 9,335,548 B1* | 5/2016 | Cakmakci | ............ | G02B 27/0172 |
| 9,377,623 B2* | 6/2016 | Robbins | .............. | G02B 27/0093 |
| 2003/0012425 A1* | 1/2003 | Suzuki | ............... | G02B 27/0093 382/154 |
| 2010/0149073 A1* | 6/2010 | Chaum | .............. | G02B 27/0093 345/8 |
| 2011/0109880 A1* | 5/2011 | Nummela | ............... | A61B 3/113 351/210 |
| 2014/0184775 A1* | 7/2014 | Drake | ...................... | A61B 3/14 348/78 |
| 2015/0185475 A1 | 7/2015 | Saarikko et al. | | |
| 2015/0289762 A1* | 10/2015 | Popovich | ........... | G02B 27/0093 351/209 |

(Continued)

*Primary Examiner* — Sardis F Azongha
(74) *Attorney, Agent, or Firm* — Fenwick & West LLP

(57) ABSTRACT

An eye tracker for determining a position of an eye, which may be integrated into a head-mounted display. The eye tracker includes a waveguide, switchable Bragg gratings (SBGs) that selectively out couple light from the waveguide, light sources coupled to the waveguide, a detector coupled to a return path of the waveguide, and a controller. The controller instructs at least one light source to emit at least one light beam propagating through the waveguide, and activates at least one SBG to out-couple the at least one light beam from the waveguide toward the eye. The waveguide in-couples at least one reflected light signal reflected from the eye that originates from the at least one light beam out-coupled from the waveguide. The detector detects the at least one reflected light signal. The controller determines a position of the eye using the detected at least one reflected light signal.

19 Claims, 6 Drawing Sheets

(56) References Cited

U.S. PATENT DOCUMENTS

| | | |
|---|---|---|
| 2016/0085300 A1 | 3/2016 | Robbins et al. |
| 2016/0139402 A1 | 5/2016 | Lapstun |
| 2018/0232048 A1 | 8/2018 | Popovich et al. |
| 2018/0275410 A1 | 9/2018 | Yeoh et al. |

* cited by examiner

WAVEGUIDE INTEGRATED EYE TRACKING

CROSS-REFERENCE TO RELATED APPLICATIONS

This application claims benefit of U.S. Provisional Patent Application Ser. No. 62/383,031, filed Sep. 2, 2016, which is hereby incorporated by reference in its entirety.

BACKGROUND

The present disclosure generally relates to eye tracking in virtual and augmented reality systems, and specifically relates to waveguide integrated eye tracking.

For further development of virtual reality (VR) systems, augmented reality (AR) systems and mixed reality (MR) systems, eye tracking serves as a necessary technology advancement that can facilitate providing information related to user's interaction and gaze direction. With efficient implementation of eye tracking, VR, AR and MR systems can focus on aspects that are directly related to a visual experience of an end-user. Based on information related to a position and orientation of a user's eye in an eye-box, a maximum pixel density (in a traditional display vernacular) may need to be provided only in a foveal region of the user's gaze, while a lower pixel resolution can be used in other regions leading to savings in power consumption and computing cycles. The resolution of pixel density can be reduced in non-foveal regions either gradually or in a step-wise fashion (e.g., by over an order of magnitude per each step).

Integrating eye tracking into a small form-factor package that maintains stability and calibration can be often challenging. Traditionally, eye tracking architectures are based on an image formation through the use of a "hot mirror", or by utilizing devices that work based on substantially similar methods. When the "hot mirror" approach is employed, an imaging device (camera) receives light that reflects off the "hot mirror" to image a user's eye-box. The light was originally emitted by a (typically) infrared (IR) light source, e.g., IR light emitting diodes (LEDs) encircling the viewing optics. In the imaging approach, this provides a path for the camera to image the eye-box region of the device, which will allow one or more surfaces of a user's eye to be imaged and correlated to a gaze direction. The image formed by the camera may identify various features of the eye, including light reflected by any visible surface, such as the anterior and posterior corneal surfaces, the pupil, the iris, the sclera, and eyebrows, eyelashes, and other facial features. Internal structures may also be observed by the camera, including reflections from the retina or the anterior or posterior crystalline lens surfaces. Eye tracking algorithms typically use a model-based approach, where these features are identified and used to refine the model parameters and, correspondingly, estimate the state of the eye, including its position and orientation with respect to a head-mounted display. In an alternative configuration, the hot-mirror can also be used in a non-imaging configuration, avoiding the need to process and use image(s) of the one or more surfaces of the user's eye. This can be achieved, for example, based on correlating an eye-gaze coordinate with a maximized "red-eye" light signal, which is maximized around the foveal location due to the so-called "foveal reflex."

However, implementing the hot-mirror based eye tracking, whether imaging or non-imaging, into a small package that maintains stability and calibration is challenging. Therefore, more efficient methods for eye tracking are desired for implementation in VR, AR and MR systems.

SUMMARY

Embodiments of the present disclosure support a waveguide based eye tracker for implementation in virtual reality (VR), augmented reality (AR) and mixed reality (MR) systems. The presented waveguide integrated eye tracker includes at least one waveguide, a plurality of switchable Bragg gratings (SBGs), an array of infra-red (IR) light sources, and a detector array. Each light source in the array of light sources can be considered as a small angular extent (point) source that emits light, and an array of point sources then forms a light bar interfaced with a waveguide (i.e., delivery waveguide). The light emitted from each light source is coupled into the waveguide and propagates through the waveguide. The light can be selectively out coupled from the waveguide toward the user's eye via one or more of the SBGs along a length of the waveguide relative to a propagation direction of light. Depending on an orientation of the user's eye relative to the emitted IR light, some of the IR light is reflected back towards the waveguide, or towards a secondary waveguide parallel to the delivery waveguide when utilizing separate input and output source waveguides to determine a position and orientation of the eye and a position of the eye in an eye-box. The IR reflected light is then coupled into the return waveguide and propagates to the detector array. In this arrangement, the waveguide(s) couple in/out approximately collimated light which has spatially distributed angular samples across the eye-box (due to control over the SBG angle and operation). Maximum return signal back at the detector occurs when the eye (i.e., fovea) is looking directly at a location of the waveguide emitting the IR light (i.e., an activated SBG column of the plurality of SBGs, with an activated IR light source in the array of light sources). Here, the approximately collimated beam of light would either enter the user's eye and be focused onto a retina which would allow a percentage of light signal to be reflected/scattered back out of the eye or be directly scattered/reflected from an exterior surface of the eye. Either way, the return signal would be approximately collimated and facilitate coupling back into the return (output) path of the waveguide structure. A controller coupled to the detector array determines a position and orientation of the eye based on what combination of SBG column/light source results in a maximum reflected IR signal and contrast while filtering for extraneous/noise to be removed from the return signal.

In some embodiments, an eye tracker includes a waveguide, a plurality of SBGs configured to selectively out couple light from the waveguide, an array of light sources coupled to the waveguide, a detector coupled to a return path of the waveguide, and a controller, interfaced with the SBGs and the array of light sources. The controller instructs at least one light source in the array of light sources to emit at least one light beam that propagates through the waveguide, and activates at least one linear SBG (i.e., one SBG column) of the plurality of SBGs to out-couple the at least one light beam from the waveguide toward an eye. The waveguide in-couples at least one reflected light signal reflected from at least one surface of the eye that originates from the at least one light beam out-coupled from the waveguide. The detector is configured to detect the at least one reflected light signal. The controller coupled to the detector determines a position (and orientation) of the eye using the detected at least one reflected light signal.

Figure 1:
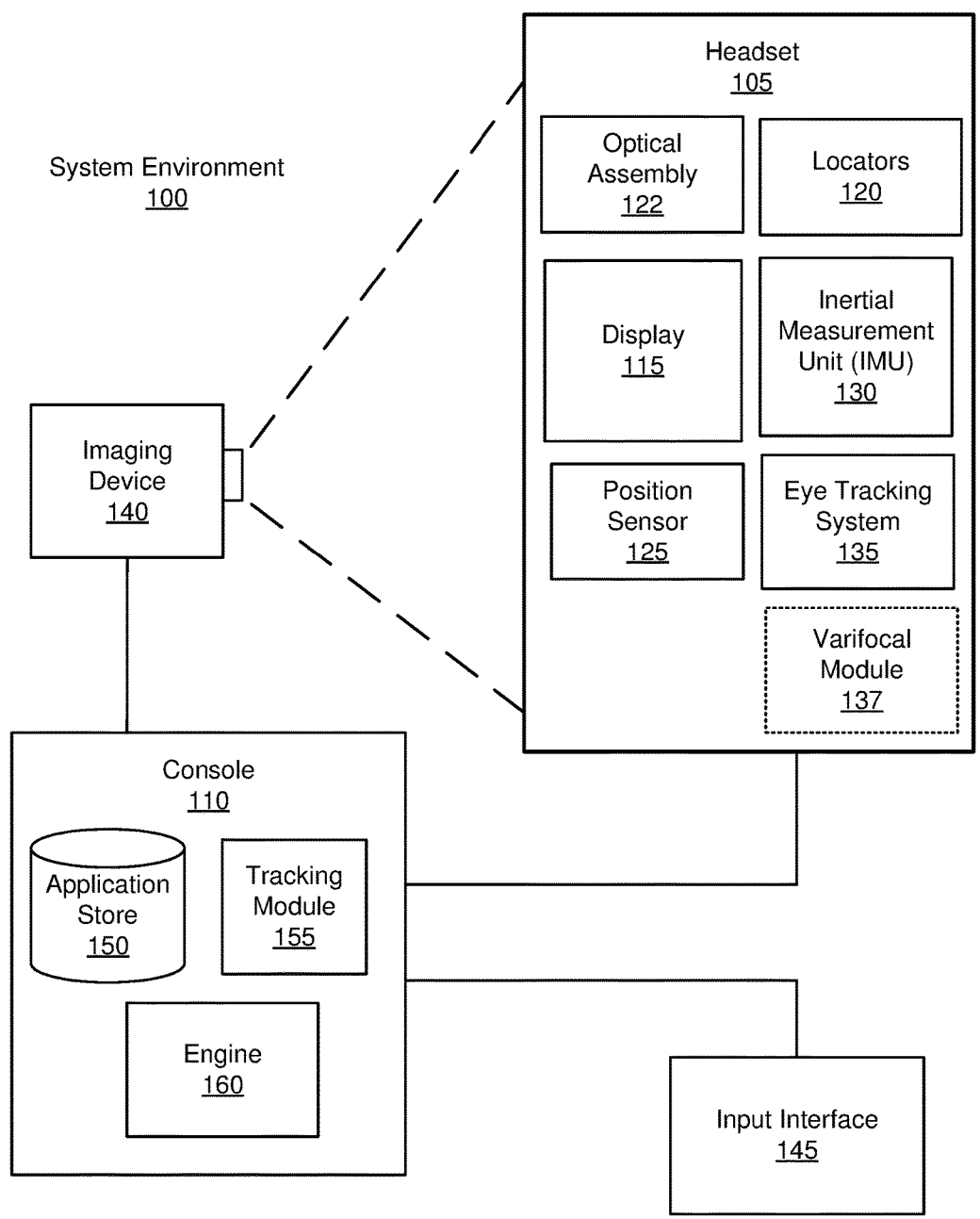
FIG. 1 is a block diagram of a system environment, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Disclosed embodiments include methods and apparatus for eye tracking in an HMD. The HMD may be part of, e.g., a VR system, an AR system, a MR system, or some combination thereof. The apparatus for eye tracking, i.e., an eye tracker, includes a plurality of switchable Bragg gratings (SBGs) designed into a waveguide. Because the implementation of eye tracking presented herein is based on the waveguide, performance accuracy of eye tracking is preserved or even improved compared to traditional methods based on "hot mirror" with similar constraints, while achieving a smaller package size and overall a lower weight. In accordance with embodiments of the present disclosure, as discussed in detail below, one or more light beams emitted from one or more light sources coupled to the waveguide can be bounced around within the waveguide to couple out via one or more of the SBGs to an eye-box of a user, reflect from at least one surface of an eye in the eye-box and couple back into the waveguide to be captured by a remote detection system interfaced with the waveguide. The strength of reflected signal captured by the detection system is directly related to an orientation of the eye and a position of the eye in the eye-box. An eye-box can be defined as a region where an entrance pupil of a human eye can be located to perceive an acceptable quality image produced by viewing optics. The eye-box is a three-dimensional region and is determined by the construction of the viewing optics and the placement of the HMD relative to the user's eye. It should be also understood that information about a position of an eye in an eye-box also includes information about an orientation of the eye, i.e., information about user's eye-gaze. Parameters of the eye-box include a lateral extent of the eye-box at a nominal eye relief of the HMD, i.e., the distance between the anterior surface of the cornea ("vertex distance") and the front surface of the HMD viewing optics. The eye tracking method presented herein is based on monitoring light reflections from at least one surface of the user's eye in the eye-box (e.g., a user's retina and/or an exterior surface of the user's eye), wherein out-coupling a light from the waveguide towards the user's eye is based on activation of one or more SBGs which may be controlled by a controller interfaced with the SBGs, as discussed in more detail below. Regarding the relation between a magnitude of a reflected signal and an orientation of the user's eye as well as a position of the user's eye in the eye-box, the presented method of eye tracking can be related to the "red-eye" based methods, where the returned "red light" is at a maximum level when the user is both accommodated and aimed at a camera/light plane.

FIG. 1 is a block diagram of a system environment 100 in which a console 110 operates. The system environment 100 shown by FIG. 1 comprises a headset 105, an imaging device 140, and an input interface 145 that are each coupled to the console 110. While FIG. 1 shows an example system 100 including one headset 105, one imaging device 140, and one input interface 145, in other embodiments any number of these components may be included in the system 100. For example, there may be multiple headsets 105 each having an associated input interface 145 and being monitored by one or more imaging devices 140, with each headset 105, input interface 145, and imaging devices 140 communicating with the console 110. In alternative configurations, different and/or additional components may be included in the system environment 100. The system 100 may operate in a VR system environment, an AR system environment, a MR system environment, or some combination thereof.

The headset 105 is a head-mounted display that presents media to a user. Examples of media presented by the headset 105 include one or more images, video, audio, or some combination thereof. In some embodiments, audio is presented via an external device (e.g., speakers and/or headphones) that receives audio information from the headset 105, the console 110, or both, and presents audio data based on the audio information. An embodiment of the headset 105 is further described below in conjunction with FIGS. 2A and 2B. The headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the headset 105 may present VR, AR, MR, or some combination thereof to a user. In the VR, AR and/or MR embodiments, the headset 105 augments views of a physical, real-world environment with computer-generated elements (e.g., images, video, sound, etc.).

The headset 105 includes a display 115, one or more locators 120, an optical assembly 122, one or more position sensors 125, an inertial measurement unit (IMU) 130, an eye tracker 135, and an optional varifocal module 137.

The display 115 displays images to the user in accordance with data received from the console 110. In some embodiments, the display 115 includes a display block and an optics block. The display block includes an electronic display, and the optics block includes one or more optical elements that transmit images from the display block to eyes of the user. In some embodiments, some or all of the functionality of the display block is part of the optics block or vice versa. In some embodiments, the display 115 can be configured to adjust the focus of the image light.

The locators 120 are objects located in specific positions on the headset 105 relative to one another and relative to a specific reference point on the headset 105. A locator 120 may be a light emitting diode (LED), a corner cube reflector, a reflective marker, a type of light source that contrasts with an environment in which the headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 2,000 nm), in the ultraviolet band (~250 nm to 380 nm), some other portion of the electromagnetic spectrum, or some combination thereof.

In some embodiments, the locators 120 are located beneath an outer surface of the headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the headset 105 are opaque in the visible band of wavelengths of light. Thus, the locators 120 may emit light in the IR band under an outer surface that is transparent in the IR band but opaque in the visible band.

The optical assembly 122 magnifies image light received from the display 115, corrects optical errors associated with the image light, and presents the corrected image light to a user of the headset 105. The optical assembly 122 includes a plurality of optical elements. Example optical elements included in the optical assembly 122 include: an aperture, a Fresnel lens, a convex lens, a concave lens, a filter, a reflecting surface, or any other suitable optical element that affects image light. Moreover, the optical assembly 122 may include combinations of different optical elements. In some embodiments, one or more of the optical elements in the optical assembly 122 may have one or more coatings, such as partially reflective or anti-reflective coatings.

Magnification and focusing of the image light by the optical assembly 122 allows the display 115 to be physically smaller, weigh less and consume less power than larger displays. Additionally, magnification may increase the field of view of the content presented by the display 115. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optical assembly 122 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 115 for display is pre-distorted, and the optical assembly 122 corrects the distortion when it receives image light from the display 115 generated based on the content.

The IMU 130 is an electronic device that generates fast calibration data based on measurement signals received from one or more of the position sensors 125. A position sensor 125 generates one or more measurement signals in response to motion of the headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the headset 105 relative to an initial position of the headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the headset 105 from the sampled data. For example, the IMU 130 integrates the measurement signals received from the accelerometers over time to estimate a velocity vector and integrates the velocity vector over time to determine an estimated position of a reference point on the headset 105. Alternatively, the IMU 130 provides the sampled measurement signals to the console 110, which determines the fast calibration data. The reference point is a point that may be used to describe the position of the headset 105. While the reference point may generally be defined as a point in space; however, in practice the reference point is defined as a point within the headset 105 (e.g., a center of the IMU 130).

The IMU 130 receives one or more calibration parameters from the console 110. The one or more calibration parameters are used to maintain tracking of the headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The eye tracker 135 determines and tracks an orientation of a user's eye, a position of the eye in an eye-box, and, optionally, other eye state parameters. In some embodiments, the eye tracker 135 determines and tracks a three-dimensional (3D) orientation of the eye and a 3D position of the eye in the eye-box. In alternate embodiments, the eye tracker 135 determines and tracks some subsets of the 3D eye orientation and 3D eye position. The eye tracker 135 includes a waveguide comprising a plurality of switchable Bragg gratings (SBGs), an array of light sources, a detector array, and a controller. Light emitted from the array of light sources is coupled into the waveguide and propagates through the waveguide until the light is out-coupled from the waveguide toward the user's eye and user's eye-box via one or more of the SBGs. The waveguide of the eye tracker 135 further couples into and propagates light reflected from at least one surface of the eye to the detector. A pixel array of the detector of the eye tracker 135 captures the reflected light and converts the captured light into light signals of various intensities. The controller of the eye tracker 135 coupled to the detector calculates magnitudes of the light signals, and determines, based on the calculated magnitudes, a position and orientation of the user's eye. More details about the eye tracker 135 are disclosed herein in relation to FIGS. 3-6.

In some embodiments, the varifocal module 137 is integrated into the headset 105. The varifocal module 137 may be coupled to the eye tracker 135 to obtain eye tracking information determined by the eye tracker 135. The varifocal module 137 may be configured to adjust focus of one or more images displayed on the display 115, based on the determined eye tracking information obtained from the eye tracker 135. In this way, the varifocal module 137 can mitigate vergence-accommodation conflict in relation to image light. The varifocal module 137 can be interfaced (e.g., either mechanically or electrically) with the display 115 and/or at least one optical element of the optical assembly 122. Then, the varifocal module 137 may be configured to adjust focus of the one or more images displayed on the display 115 by adjusting position of the display 115 and/or position of the at least one optical element of the optical assembly 115, based on the determined eye tracking information obtained from the eye tracker 135. By adjusting the position, the varifocal module 137 varies focus of image light output from the display 115 towards the user's eye. The varifocal module 137 may be also configured to adjust resolution of the images displayed on the display 115 by performing foveated rendering of the displayed images, based at least in part on the determined eye tracking information obtained from the eye tracker 135. In this case, the varifocal module 137 provides appropriate image signals to the display 115. The varifocal module 137 provides image signals with a maximum pixel density for the display 115 only in a foveal region of the user's eye-gaze, while providing image signals with lower pixel densities in other regions of the display 115. The various additional applications of the varifocal module 137 based on the eye tracking information include, but are not limited to, providing user interfaces (e.g., gaze-based selection), attention estimation (e.g., for user safety), different gaze-contingent display modes (e.g., adaptive optical distortion correction, synthetic depth of field rendering), metric scaling for depth and parallax correction (e.g., inter-pupillary distance (IPD) and eye-box adjustment), etc.

The imaging device 140 generates slow calibration data in accordance with calibration parameters received from the console 110. Slow calibration data includes one or more images showing observed positions of the locators 120 that are detectable by the imaging device 140. The imaging device 140 may include one or more cameras, one or more video cameras, any other device capable of capturing images including one or more of the locators 120, or some combination thereof. Additionally, the imaging device 140 may include one or more filters (e.g., used to increase signal to noise ratio). The imaging device 140 is configured to detect light emitted or reflected from locators 120 in a field of view of the imaging device 140. In embodiments where the locators 120 include passive elements (e.g., a retroreflector), the imaging device 140 may include a light source that illuminates some or all of the locators 120, which retro-reflect the light towards the light source in the imaging device 140. Slow calibration data is communicated from the imaging device 140 to the console 110, and the imaging device 140 receives one or more calibration parameters from the console 110 to adjust one or more imaging parameters (e.g., focal length, focus, frame rate, sensor temperature, shutter speed, aperture, etc.).

The input interface 145 is a device that allows a user to send action requests to the console 110. An action request is a request to perform a particular action. For example, an action request may be to start or end an application or to perform a particular action within the application. The input interface 145 may include one or more input devices. Example input devices include: a keyboard, a mouse, a game controller, or any other suitable device for receiving action requests and communicating the received action requests to the console 110. An action request received by the input interface 145 is communicated to the console 110, which performs an action corresponding to the action request. In some embodiments, the input interface 145 may provide haptic feedback to the user in accordance with instructions received from the console 110. For example, haptic feedback is provided when an action request is received, or the console 110 communicates instructions to the input interface 145 causing the input interface 145 to generate haptic feedback when the console 110 performs an action.

The console 110 provides media to the headset 105 for presentation to the user in accordance with information received from one or more of: the imaging device 140, the headset 105, and the input interface 145. In the example shown in FIG. 1, the console 110 includes an application store 150, a tracking module 155, and an engine 160. Some embodiments of the console 110 have different modules than those described in conjunction with FIG. 1. Similarly, the functions further described below may be distributed among components of the console 110 in a different manner than is described here.

The application store 150 stores one or more applications for execution by the console 110. An application is a group of instructions, that when executed by a processor, generates content for presentation to the user. Content generated by an application may be in response to inputs received from the user via movement of the headset 105 or the interface device 145. Examples of applications include: gaming applications, conferencing applications, video playback application, or other suitable applications.

The tracking module 155 calibrates the system 100 using one or more calibration parameters and may adjust one or more calibration parameters to reduce error in determination of the position of the headset 105. For example, the tracking module 155 adjusts the focus of the imaging device 140 to obtain a more accurate position for observed locators on the headset 105. Moreover, calibration performed by the tracking module 150 also accounts for information received from the IMU 130. Additionally, if tracking of the headset 105 is lost (e.g., the imaging device 140 loses line of sight of at least a threshold number of the locators 120), the tracking module 155 re-calibrates some or all of the system environment 100.

The tracking module 155 tracks movements of the headset 105 using slow calibration information from the imaging device 140. The tracking module 155 determines positions of a reference point of the headset 105 using observed locators from the slow calibration information and a model of the headset 105. The tracking module 155 also determines positions of a reference point of the headset 105 using position information from the fast calibration information. Additionally, in some embodiments, the tracking module 155 may use portions of the fast calibration information, the slow calibration information, or some combination thereof, to predict a future location of the headset 105. The tracking module 155 provides the estimated or predicted future position of the headset 105 to the engine 160.

The engine 160 executes applications within the system environment 100 and receives position information, acceleration information, velocity information, predicted future positions, or some combination thereof of the headset 105 from the tracking module 155. Based on the received information, the engine 160 determines content to provide to the headset 105 for presentation to the user. For example, if the received information indicates that the user has looked to the left, the engine 160 generates content for the headset 105 that mirrors the user's movement in a virtual environment. Additionally, the engine 160 performs an action within an application executing on the console 110 in response to an action request received from the input interface 145 and provides feedback to the user that the action was performed. The provided feedback may be visual or audible feedback via the headset 105 or haptic feedback via the input interface 145.

The engine 160 can be configured to utilize, in association with the console 110 and the headset 105, the eye tracking information obtained from the eye tracker 135 for a variety of display and interaction applications. The various applications include, but are not limited to, user interfaces (gaze-based selection), attention estimation (for user safety), gaze-contingent display modes (foveated rendering, varifocal optics, adaptive optical distortion correction, synthetic depth of field rendering), etc. In some embodiments, based on information about position of the user's eye in the eye-box, orientation of the user's eye and an angle of eye-gaze received from the eye tracker 135, the engine 160 determines resolution of the content provided to the headset 105 for presentation to the user on the display 115. The engine 160 provides the content to the headset 105 having a maximum pixel density (maximum resolution) on the display 115 in a foveal region of the user's gaze, whereas the engine 160 provides a lower pixel resolution in other regions of the display 115, thus achieving less power consumption at the headset 105 and saving computing cycles of the console 110 without compromising a visual experience of the user. In some embodiments, the engine 160 can be configured to optimize the performance of viewing optics of the headset 105, based on the eye tracking information obtained from the eye tracker 135. In one embodiment, the engine 160 can adjust optical distortion correction parameters of the viewing optics, e.g., to prevent vergence-accommodation conflict. In an alternate embodiment, the engine 160 can adjust focus of images displayed on the display 115, e.g., to prevent vergence-accommodation conflict. Additional details regarding headsets with varifocal capability are discussed in U.S. application Ser. No. 14/963,126, filed Dec. 8, 2015, U.S. application Ser. No. 14/963,109, filed Dec. 8, 2015, and are herein incorporated by reference in their entireties.

Figure 2A:
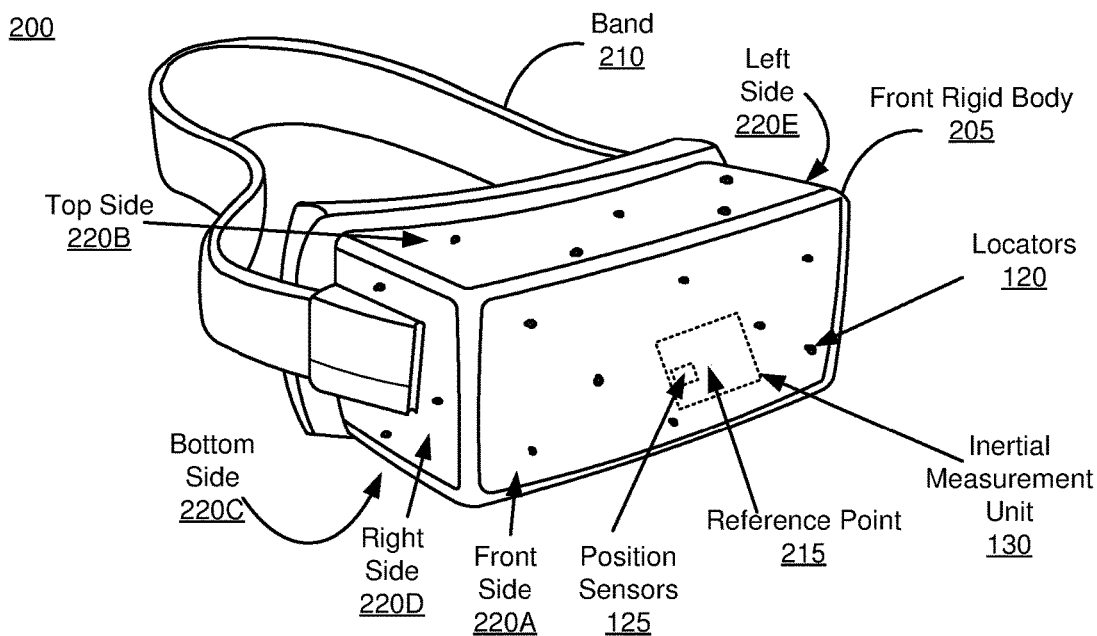
FIG. 2A is a diagram of a head-mounted display (HMD), in accordance with an embodiment.

FIG. 2A is a diagram of a HMD 200, in accordance with an embodiment. The HMD 200 may be part of, e.g., a VR system, an AR system, a MR system, or some combination thereof. In embodiments that describe AR system and/or a MR system, portions of a front side 220A of the HMD 200 are at least partially transparent in the visible band (~380 nm to 750 nm), and portions of the HMD 200 that are between the front side 220A of the HMD 200 and an eye of the user are at least partially transparent (e.g., a partially transparent electronic display). The HMD 200 is an embodiment of the headset 105, and includes a front rigid body 205, a band 210, and a reference point 215. The front rigid body 205 includes one or more electronic display elements of the display 115 (not shown in FIG. 2A), one or more eye trackers 135 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 140. Locators 120, or portions of locators 120, are located on a front side 220A, a top side 220B, a bottom side 220C, a right side 220D, and a left side 220E of the front rigid body 205 in the example of FIG. 2A. The HMD 200 may be part of, e.g., a VR system, an AR system, a MR system, or some combination thereof.

Figure 2B:
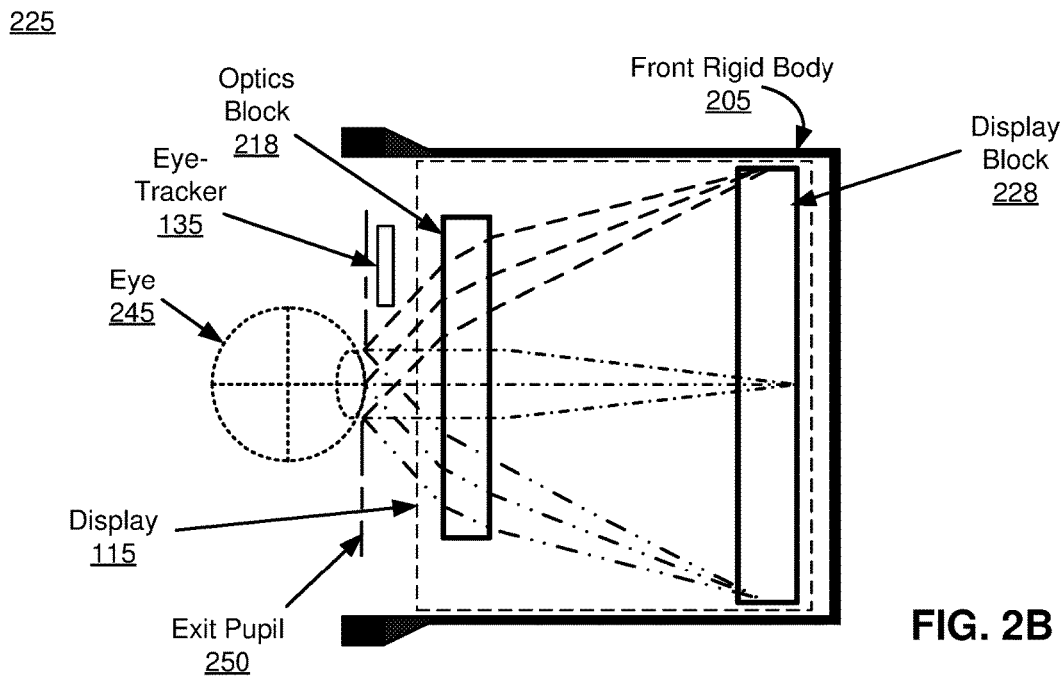
FIG. 2B is a cross section of a front rigid body of the HMD in FIG. 2A, in accordance with an embodiment.

FIG. 2B is a cross section 225 of the front rigid body 205 of the embodiment of the HMD 200 shown in FIG. 2A. As shown in FIG. 2B, the front rigid body 205 includes the display 115 that provides focus adjusted image light to an exit pupil 250. The display 115 includes a display block 228 and an optics block 218. The exit pupil 250 is the location of the front rigid body 205 where a user's eye 245 is positioned. For purposes of illustration, FIG. 2B shows a cross section 225 associated with a single eye 245, but another display, separate from the display 115, provides altered image light to another eye of the user.

The display block 228 generates image light. In some embodiments, the display block 228 includes an optical element that adjusts the focus of the generated image light. The display 115 displays images to the user in accordance with data received from the console 110. In various embodiments, the display 115 may comprise a single electronic display or multiple electronic displays (e.g., a display for each eye of a user). Examples of the electronic display include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a waveguide-based display, some other display, a projector, or some combination thereof. The display 115 may also include an aperture, a Fresnel lens, a refractive lens including a convex or a concave lens, a filter, a polarizer, a diffuser, a fiber taper, a reflective optical element, or any other suitable optical element that affects the image light emitted from the electronic display. In some embodiments, one or more of the display block optical elements may have one or more coatings, such as anti-reflective coatings.

The optics block 218 magnifies received light from the display block 228, corrects optical aberrations associated with the image light, and the corrected image light is presented to a user of the headset 105. An optical element may be an aperture, a Fresnel lens, a refractive lens including a convex or a concave lens, a filter, a reflective optical element, a diffractive optical element, or any other suitable optical element that affects the image light emitted from the display block 228. Moreover, the optics block 218 may include combinations of different optical elements. In some embodiments, one or more of the optical elements in the optics block 218 may have one or more coatings, such as anti-reflective coatings. Magnification of the image light by the optics block 218 allows elements of the display block 228 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 218 is designed so its effective focal length is larger than the spacing to the display block 228, which magnifies the image light projected by the display block 228. Additionally, in some embodiments, the amount of magnification may be adjusted by adding or removing optical elements. As shown in FIG. 2B, the front rigid body 205 further includes the eye tracker 135 placed between the user's eye 245 and the optics block 218, which determines and tracks a position and orientation of the user's eye 245. In alternate embodiments, the eye tracker 135 is placed between the optics block 218 and the display block 228 or within the optics block 218. Eye tracking information obtained by the eye tracker 135 can be used for various applications, including but not limited to foveated rendering, user interaction, synthetic depth of field rendering, adjusting optical distortion correction parameters of one or more optical elements of the optics block 218, adjusting focus of images displayed on the display block 228, etc. More details about the eye tracker 135 are disclosed herein in relation to FIGS. 3-6. Note that the embodiments shown in FIGS. 2A and 2B are not limiting to VR applications, and AR and MR applications are obvious extensions of the embodiments illustrated by FIGS. 2A and 2B.

Figure 3:
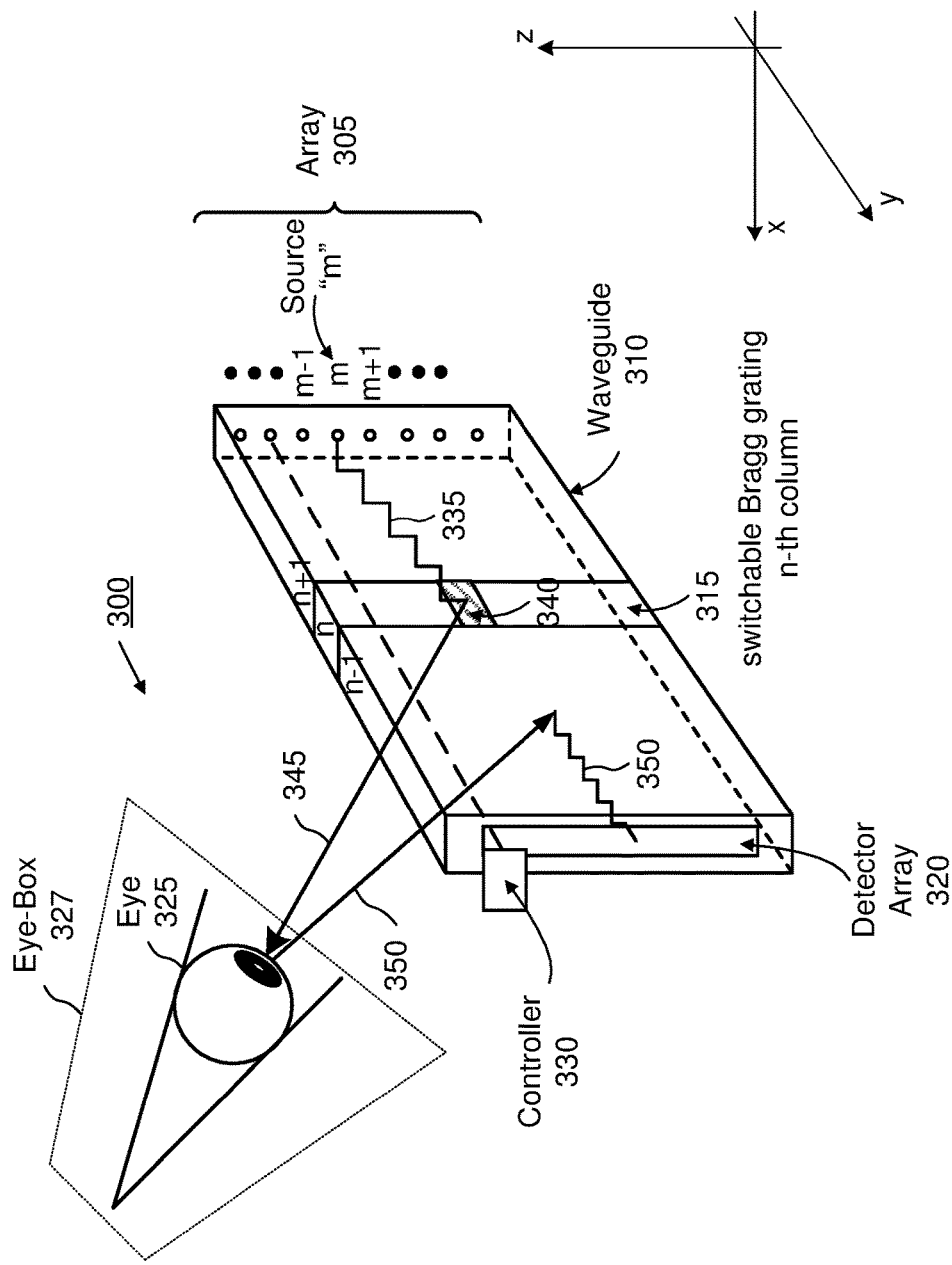
FIG. 3 illustrates an eye tracker, in accordance with an embodiment.

FIG. 3 illustrates an eye tracker 300, in accordance with an embodiment. In some embodiments, the eye tracker 300 is an embodiment of the eye tracker 135 of the HMD 105 shown in FIG. 1. In other embodiments, the eye tracker 135 is part of some other HMD. As illustrated in FIG. 3, the eye tracker 300 comprises an array of light sources 305, a waveguide 310, a plurality of SBGs 315 (e.g., SBG columns n−1, n, n+1, . . . ) designed into the waveguide 310, and a detector array 320. The SBG columns 315 are part of the waveguide 310, and the waveguide 310 is coupled to the array of light sources 305 and the detector array 320. The SBGs 315 provide for one-axis control of which "line" of light (e.g., emitted from one of the light sources 305) is out-coupled from the waveguide 310 and aimed at a user's eye 325 in an eye-box 327. A controller 330 coupled to the waveguide 310 instructs at least one light source in the array of light sources 305 to emit light and at least one specific "line" or column of the SBGs 315 (e.g., the n-th SBG column, as illustrated in FIG. 3) at a particular time instant. After the specific light source emits light and the specific SBG column 315 is activated, a beam of light is out-coupled from that specific SBG emission portion of the waveguide 310 at a certain angle to aim at a specific position in the eye-box 327. Through activation of the specific SBG 315, a column of the waveguide 310 corresponding to the activated n-th SBG 315 is selected, whereas through selection of the specific light source that emits light, a row of the waveguide 310 is selected. Thus, the waveguide 310 forms a grid of possible emission points, whereas each emission point on the waveguide 310 is selected based on the combination of a particular SBG and a light source.

In an illustrative embodiment shown in FIG. 3, a light beam 335 is emitted from the m-th light source selected from the array of light sources 305, and is transmitted via the m-th row of the waveguide 310 along y axis of the waveguide 310 under total internal reflection (TIR) until reaching the activated column n of the SBGs 315. The activated SBG 315 outputs the light beam 335 at a particular location or emission portion 340 of the waveguide 310 in an output path 345 on a prescribed angle relative to the emission portion 340 on the waveguide 310. Emitting the beam of light based on selection of a specific light source or a propagation row of the waveguide 310 and activation of a particular column of the SBGs 315 provides for control over angular and spatial domains, which facilitates finding a peak retro-reflectivity condition, rejecting noise in a return signal, and overall locating a user's gaze direction.

In some embodiments, each column of the SBGs 315 is designed for a specific out-coupling angle. The SBGs 315 can be designed to cover a range of expected positions and orientations of the eye 325 within the eye-box 327 and relative to a sampling basis for a displayed field-of-view. In an illustrative embodiment, when activated, the column n of the SBGs 315 may eject light at 20 degrees relative to a surface normal to the waveguide 310, and a column n+10 of the SBGs 315 may have the same out-coupling angle. But, because the column n+10 is, for example, 3 millimeters away from the column n, the column n+10 covers a different part of the eye-box 327. In some embodiments, an out-coupling angle for any given SBG column is a joint design between (a) how many SBGs can fit in a defined area (relative to the design architecture, layout, etc.) and (b) what portion of eye-box/field-of-view should be covered.

In some embodiments, the array of light sources 305 is coupled into one edge of the waveguide 310. The array of light sources 305 is a linear array of light sources that emit in the infrared (IR). A wavelength of the light emitted from the array of light sources 305 may be greater than 800 nm, preferably greater than 1,000 nm in order to avoid being noticed by the user. The light sources 305 may be micrometer scale light-emitting diodes (LEDs) or 'micro-leds', lasers (e.g., edge-emitter lasers or vertical-cavity surface-emitting laser (VCSEL) diode lasers), and the like.

In some embodiments, a linear detector is coupled into a return path of the waveguide 310. The light beam 335 that is out-coupled from the waveguide 310 via the SBG column 315 toward the user's eye 325 is reflected from one surface of the eye 325 as a light beam 350 that is coupled back into the waveguide 310 and captured by the linear detector after propagating through the waveguide 310 along the y axis of the waveguide 310, as shown in FIG. 3. In the illustrative embodiment shown in FIG. 3, the linear detector is configured in the form of detector array 320 that is coupled to the waveguide 310 on a side of the waveguide 310, herein shown as being opposite of the light source array 305. In another embodiment (not shown in FIG. 3), the detector is coupled into the waveguide 310 through a beam-splitter on the same side of the waveguide 310 with the array of light sources 305 or otherwise distributed together on a surface plane. The detector array 320 may comprise silicon, Indium gallium arsenide (InGaAs), or some other material that is operational at or above 800 nm and preferably above 1,000 nm, which corresponds to a wavelength of IR light emitted from the light sources 305. The detector array 320 may comprise Y×Z array of pixels, where Y and Z are integers. Note that dimensions Y and Z in the array of pixels of the detector array 320 may correspond toy and z axis respectively of the coordinate system shown in FIG. 3 that also correspond to axis of the waveguide 310. In one embodiment, Y is one and Z can be 250 or larger. Alternatively, for correlation or reliability reasons, the detector array 320 may comprise a rectangular array of pixels where Y is two or more. In an illustrative embodiment, the detector array 320 comprises Y×Z array of pixels, where Y is 2 or 3 and Z is much larger than 10. The detector array 320 can be configured to operate in a common mode or balanced detector scenario, to improve the noise floor. In this manner, only signals that are detected on pixels next to each other in any Y column are reported (e.g., double sampling, or 'balanced' photodiode scheme), which allows operation at otherwise unattainable lower signal levels. In some embodiments, the detector array 320 is designed to fit on a common surface. For example, the detector array 320 and the light sources 305 are located on a common complementary metal-oxide-semiconductor (CMOS) backplane, where the array of pixels may be on either side of the array of light sources. In an alternative embodiment, the detector array 320 coupled to the waveguide 310 may comprise X×Z array of pixels located along dimensions X and Z, corresponding to the x- and z-axis respectively of the coordinate system shown in FIG. 3. Herein, the smaller dimension can be abutted to an edge of the waveguide 310 (e.g., X dimension along the x-axis), or as previously discussed through the use of an out-coupler or fold optic in line with the waveguide (e.g., Y dimension along the y-axis). Either way, the longer dimension of the detector array 320 (e.g., Z dimension along the z-axis) corresponds to the height of the eye-box 327 and covers the height of the waveguide structure 310.

The controller 330 is configured to control selection of the light sources 305 to emit light and activation of SBG columns 315. As illustrated in FIG. 3, the controller 330 is coupled to the array of light sources 305, and configured to individually control the selection of any of the light sources 305 to emit light. The controller 330 is further interfaced with the SBGs 315, and controls activation of one or more columns of the SBGs 315 at a time in synchronization with selection of one or more light sources 305 to emit light. Selection of a particular light source to emit light (or a row of the waveguide 310 for light propagation) in combination with activation of SBG column 315 controlled by the controller 330 provides for the cross-axis control of a portion on the waveguide 310 from where the light is out-coupled to illuminate a selected point or area of interest on a surface of the eye 325, such as the emission portion 340 shown in FIG. 3 determined by selection of the m-th light source 335 and activation of the n-th SBG column 315.

After the eye tracker 300 is in a search mode or in a track mode, as discussed in more detail below, the controller 330 instructs one or more light sources in the array 305 to emit light. The controller 330 further activates one or more specific columns of the SBGs in sync with selection of the one or more light sources 305. In this way, the light emitted from a pre-determined set of light sources 305 propagates through one or more rows of the waveguide 310 along y axis of the waveguide 310 in sync with activation of the one or more specific columns of the SBGs 315, thus providing one or more specific SBG output paths for light being out-coupled from the waveguide 310 towards the eye 325.

In one embodiment, when location of the eye-box 327 is not known, the eye tracker 300 is in a search operational mode. In this case, the controller 330 may instruct nearly all or pre-defined patterns of the light sources 305 to simultaneously emit light beams that propagate through multiple rows of the waveguide 310 along y axis of the waveguide 310. In sync with selection of the pre-defined patterns of the light sources in the array 305, the controller 330 also activates one or more specific columns of the SBGs 315 at a time to out-couple the light beams from specific field locations of the waveguide 310. By activating different columns of the SBGs 315 in different time instants along with emitting light from the light sources 305, the controller 330 controls out-coupling of light beams from all desired field locations (emission points) of the waveguide 310, thus performing a comparably fast search of the eye-box 327 and the eye 325. Some of the light beams being out-coupled from the waveguide 310 would reach a surface of the eye 325, reflect back to the waveguide 310 and propagate through the waveguide 310 (along the y axis) until being captured by pixels of the detector array 320. The controller 330 coupled to the detector 320 calculates magnitudes and/or relative contrasts of the reflected and captured light beams, and maps each of the calculated magnitudes/relative contrasts to a specific field location (emission point) on the waveguide 310 from which a corresponding light beam was out-coupled from the waveguide 310. The controller 330 determines a position and orientation of the eye 325 based on mapping a largest relative contrast/magnitude among the calculated magnitudes/relative contrasts of the reflected light beams to a field location (emission point) on the waveguide 310 from which a corresponding light beam was out-coupled toward the eye 325 and where the eye 325 is looking directly. Once the position and orientation of the user's eye 325 is determined, the eye tracker 300 can move to a tracking mode of operation. It should be understood that a position of the eye 325 can also include an orientation of the eye 325. Each calculated magnitude/relative contrast can be referred to herein as position data. The controller 330 may determine a position of the eye 325 (including an orientation of the eye 325) based on mapping the position data to a field location (emission point) on the waveguide 310 from which a corresponding light beam was out-coupled toward the eye 325.

In some embodiments, the light sources in the array 305 can operate at different wavelengths and/or different modulations, which may be controlled by, e.g., the controller 330. In this case, interference of light beams reflected from various surfaces of the user's eye 325 and coupled into the waveguide 310 can be efficiently mitigated since different reflected light beams feature different wavelengths and/or modulations. Because of the mitigated interference between multiple reflected light beams that propagate through the waveguide 310 and reach the detector array 320, the controller 330 can determine more accurately a maximum relative contrast/magnitude among the reflected and captured light beams.

In the tracking mode of the eye tracker 300, the controller 330 selects, based on the previously determined position and orientation of the user's eye 325, a specific sub-set of the light sources 305 (e.g., two or more light sources 305) to emit light in sync with activation of one or more specific columns of the SBGs 315. The light emitted from the sub-set of light sources 305 is out-coupled from the waveguide 310 via the selected SBG column(s) 315 toward the eye 325 and reflected back to be in-coupled at the waveguide 310 for propagating to the detector 320. Following this, the detector 320 and the controller 330 perform the same operations as in the search mode of the eye tracker 300, i.e., capturing the reflected light and determining magnitudes/relative contrasts of reflected light beams as well as mapping the determined magnitudes/relative contrasts to particular out-coupling locations on the waveguide 310. The controller 330 determines, based on a largest magnitudes/relative contrasts among the determined magnitudes/relative contrasts and the mapping, a position and orientation of the eye 325 or at least direction in which the eye 325 is moving since the previous position of the eye 325 is known from the search mode. If the controller 330 determines that the eye 325 is moving in a particular direction, the controller 330 instructs another specific sub-set of the light sources 305 to emit light in sync with activation of one or more specific SBG columns 315 for out-coupling of the emitted light. The process of capturing the light reflected from at least one surface of the eye 325 and determining magnitudes/relative contrasts of reflected light is repeated in order to keep track of the position and orientation of the eye 325 in the eye-box 327.

If the controller 330 determines, based on magnitudes/relative contrasts of reflected and captured light, that the eye 325 is in a stationary position within the eye-box 327 and only orientation of the eye 325 is changing (i.e., only gaze direction is changing), the controller 330 and the eye tracker 300 can proceed to a fine resolution tracking mode of operation. In this operational mode, the controller 330 instructs only one specific light source in the array 305 to emit light in sync with activation of one specific SBG column 315 for out-coupling a light beam, in order to pinpoint an out-coupling (emission) point on the waveguide 310 that corresponds to an orientation of the eye 325 (i.e., gaze direction). In the tracking and fine-resolution tracking operational modes, power consumption of the eye tracker 300 can be saved since the controller 330 selects only a small portion of the light sources 305 to emit light. The controller 330 can independently control two degrees of freedom, i.e., a column of the SBGs 315 (i.e., a position on y axis of the waveguide 310) and a propagating row of a light beam along the waveguide 310 that corresponds to a light source in the array 305 that emits the light beam (i.e., a position on z axis of the waveguide 310), which allows for an approximately millimeter sized light beam to be aimed at the eye 325 from the waveguide 310 across a field-of-view having a desired small size.

In the illustrative embodiment shown in FIG. 3 that corresponds to the fine resolution tracking mode of operation of the eye tracker 300, the controller 330 instructs one particular light source in the array 305 (e.g., the m-th source) to emit a light beam (e.g., the light beam 335) and activates in sync one linear SBG (i.e., one SBG column) of the plurality of SBGs 315. The light beam 335 propagates through the waveguide 310 (i.e., along y axis) and is out-coupled from the waveguide 310 at the emission portion 340 determined by the m-th light source 305 emitting the light beam 335 and by the activated n-th SBG column 315. By out-coupling the light beam 335 from the particular emission portion 340, the light beam 335 is emitted along the output path 345 at a given angle from the waveguide 310 and aimed at a specific surface (e.g., pupil) of the eye 325. The detector array 320 operates in sync with the selected m-th light source in the array 305 and with the activated n-th SBG column 315 to capture the light beam 350 reflected from one surface of the eye-box 325 and coupled back into the waveguide 310 propagating through the waveguide 310 along y axis toward the detector array 320. In some embodiments, as discussed, the controller 330 determines, based on the reflected light beam 350 captured by the detector array 320, a magnitude of a light signal associated with the captured reflected light beam 350. The magnitude of the light signal corresponds to a magnitude of an integrated signal reflected at a specific time instant from the surface of the eye 325. The controller 330 may be further configured to detect a frequency/amplitude modulation scheme of the reflected light beam 350 captured by the detector array 320.

In some embodiments, during the search mode of the eye tracker 300, the sequence of light sources in the array 305 being instructed by the controller 330 to emit light and the sequence of SBG columns 315 being activated by the controller 330 for out-coupling beams of light from the waveguide 310 can progress until all emission points on the waveguide 310 are exhausted. When light beams reflected from various surfaces of the eye-box 325 are captured by the detector array 320, the controller 330 generates mapping between all emission points on the waveguide 310 determined by combinations of activated SBG column 315 and selected light source 305, where magnitudes of the reflected and captured light beams are functions of both an eye-box spatial coordinate and an angular field. The controller 330 is further configured to determine a largest relative contrast/magnitude of a returned (i.e., reflected and coupled) light beam captured by the detector array 320, which, after appropriate filtering, uniquely determines a position and orientation of the user's eye 325. Hence, the presented method for eye tracking provides 1:1 correlation between magnitudes/contrasts of reflected light beams and position/orientation of a user's eye.

In some embodiments, after the controller 330 determines the largest magnitude/contrast of the reflected light beams and thus a position and orientation of the eye 325 (gaze direction), the controller 330 can switch the eye tracker 300 into the tracking mode and then to the fine tracking mode of operation, as discussed above. During the fine tracking operational mode and when the gaze direction does not change frequently, the controller 330 locks the eye tracker 300 onto a particular combination of a light source 305 instructed to emit light and an activated SBG column 315 for out-coupling of light. The combination of light source 305 emitting light and activated SBG column 315 out-coupling the light provides for a maximum reflected light signal, i.e., a returned light signal with a largest relative contrast/magnitude among all reflected light signals in the search mode. In this manner, the controller 300 can lock the eye tracker 300 onto a maximum reflected light signal.

Figure 4:
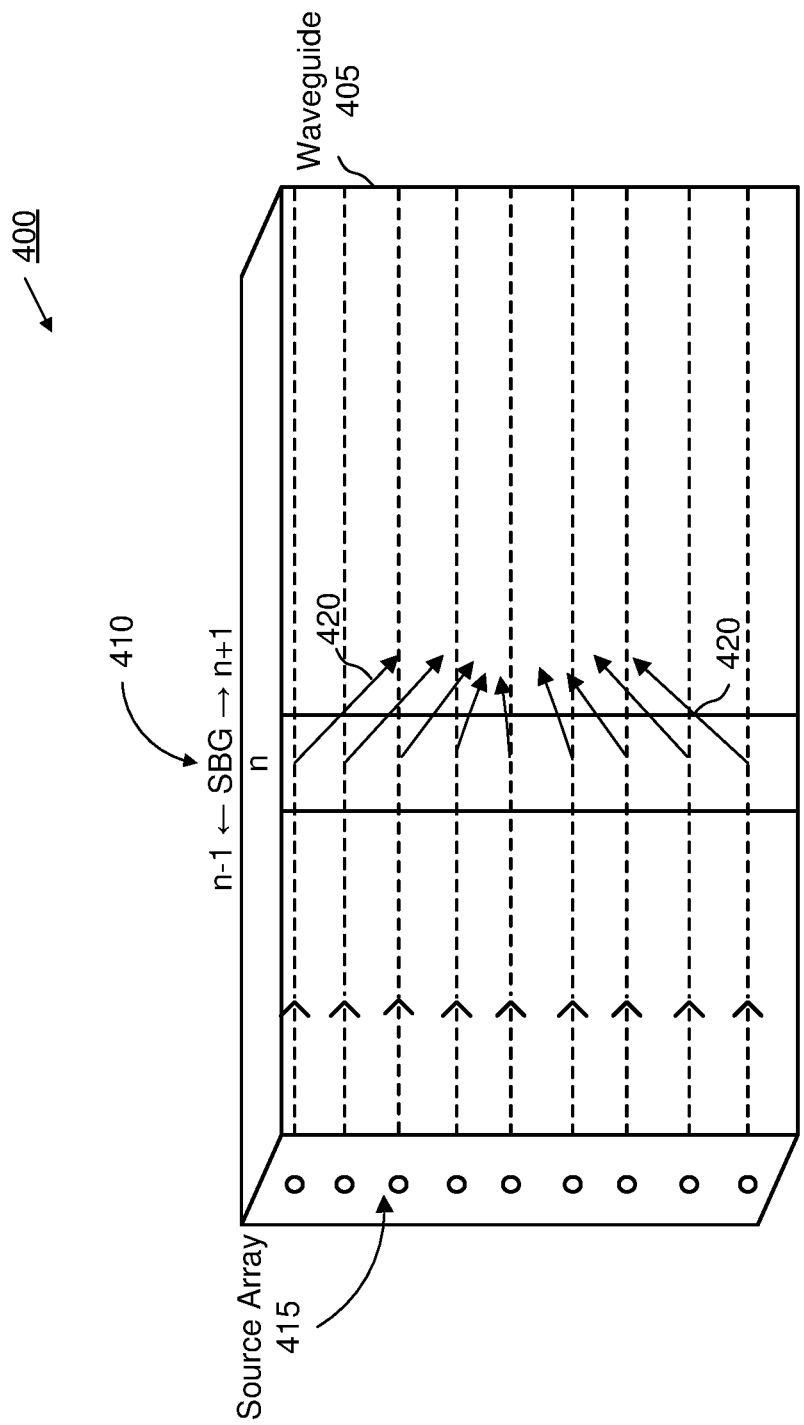
FIG. 4 illustrates an isometric view of a waveguide comprising a plurality of switchable Bragg gratings (SBGs) that operate in synchronization with an array of light sources for eye tracking, in accordance with an embodiment.

FIG. 4 illustrates an isometric view 400 of a waveguide 405 comprising a plurality of SBGs 410 that operates in synchronization with an array of light sources 415 for eye tracking, in accordance with an embodiment. The isometric view 400 of the waveguide 405 may represent one mode of operation of the eye tracker 300 shown in FIG. 3, such as the search mode of the eye tracker 300.

In an illustrative embodiment shown in FIG. 4, the light sources 415 emit a plurality of light beams 420 that propagate along the waveguide 405. The plurality of emitted light beams 420 are out-coupled from the waveguide 405 via a specific column of the SBGs 410 (e.g., the n-th SBG column, as illustrated in FIG. 4) toward a user's eye (not shown in FIG. 4). As illustrated in FIG. 4, different light beams 420 emitted from different light sources 415 are out-coupled toward the user's eye from the same n-th SBG column 410 at different angular orientations relative to the waveguide 405. In this way, different light beams 420 emitted from different light sources 415 reach different regions of a user's eye-box (not shown in FIG. 4), thus facilitating an increased resolution for determining a position and orientation of a user's eye.

Figure 5:
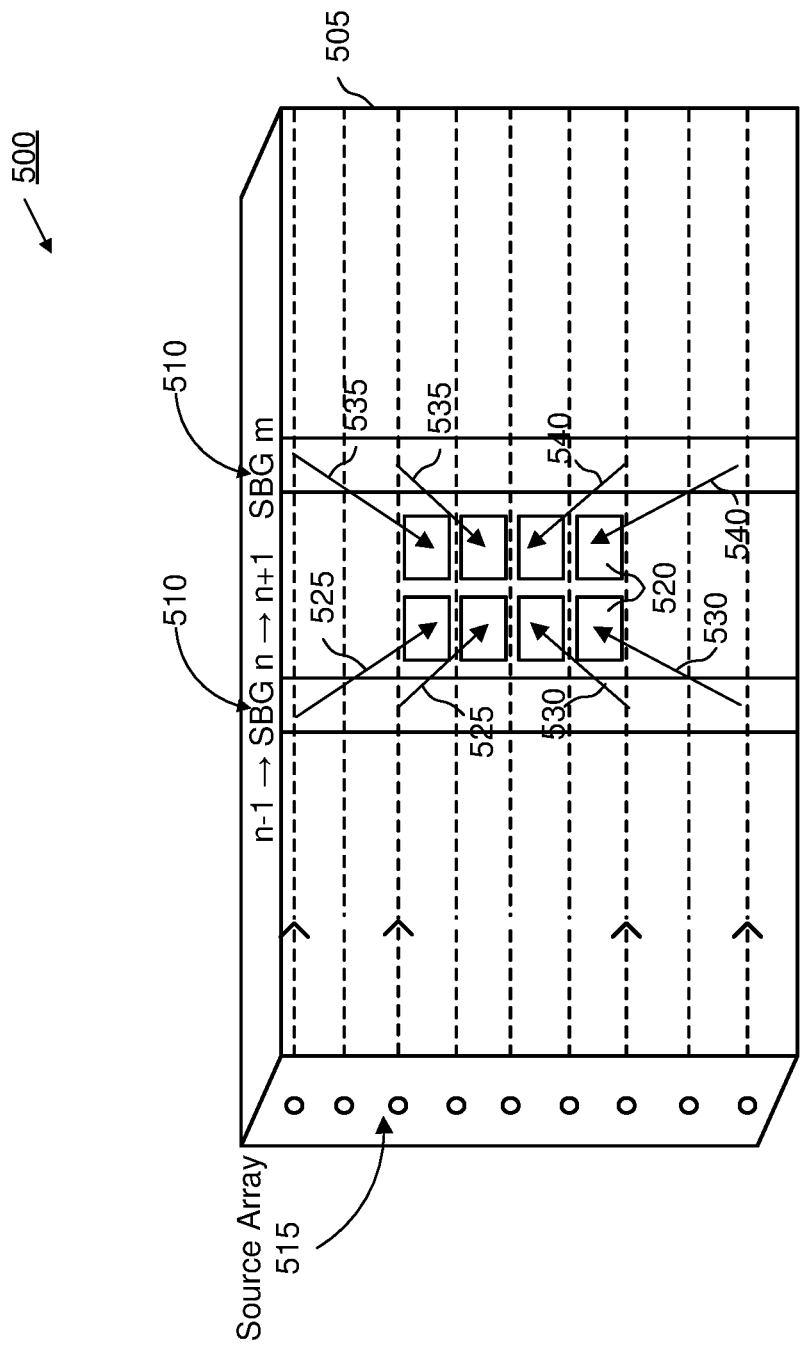
FIG. 5 illustrates an isometric view of a waveguide comprising SBGs that out-couple light emitted from different light sources into different portions of a user's eye-box, in accordance with an embodiment.

FIG. 5 illustrates an isometric view 500 of a waveguide 505 comprising SBGs 510 that out couple light emitted from different light sources 515 into different portions of a user's eye-box 520, in accordance with an embodiment. The isometric view 500 may represent one mode of operation of the eye tracker 300 shown in FIG. 3, such as the tracking mode of the eye tracker 300 where certain light sources 515 are selected to emit light. Each light source in the array of light sources 515 emits light that is coupled into a linear waveguide path (e.g., through launch conditions) that traverses the waveguide 505 until an activated n-th SBG column 510 out-couples the light from the waveguide 505. Thus, all the light emitted from the light sources 515 is output from the waveguide 505 at the activated n-th SBG column 510. As illustrated in FIG. 5, light beams 525 emitted at the upper half of the n-th SBG column 510 are aimed spatially down relative to the waveguide 505, whereas light beams 530 emitted at the lower half of the n-th SBG column 510 are aimed spatially up relative to the waveguide 505 in order to reach into an appropriate portion of the user's eye-box 520. As further illustrated in FIG. 5, light beams emitted from the light sources 515 may be also ejected (e.g., at the same or another time instant) from another activated SBG column, i.e., the m-th SBG column 510. Similarly as for the light beams out-coupled from the n-th SBG column 510, light beams 535 out-coupled at the upper half of the m-th SBG column 510 are aimed spatially down relative to the waveguide 505, whereas light beams 540 emitted at the lower part of the m-th SBG column 510 are aimed spatially up relative to the waveguide 505 in order to reach into a specific region of the user's eye-box 520. As illustrated in FIG. 5, regions of the user's eye-box 520 reached by the light beams 535, 540 out-coupled by activating the m-th SBG column 510 may be different than regions of the eye-box 520 reached by the light beams 525, 530 out-coupled by activating the n-th SBG column 510. Therefore, simultaneous activation of multiple columns of SBGs provides for illumination of a broader portion of a user's eye-box, which facilitates more robust search for a position and orientation of a user's eye.

In one embodiment, a distance between the activated n-th SBG column 510 and the activated m-th SBG column 510 is approximately on the scale of a fraction of a millimeter, which can also represent the minimum separation between two successive SBG columns. Thus, a retro-reflection path backwards from a surface of an eye in the eye-box 520 to the waveguide 505 can cover various degrees related to a field-of-view. The methods and systems illustrated in FIGS. 3-5 also allow neighboring SBG columns to focus on different aspects of the user's eye-box, and to use spatial division to relax the eye-box accuracy requirements.

Disclosed embodiments include an architecture implementation of a waveguide for in- and out-coupling of light beams based on activation of SBGs, whereas light sources may operate in the near-infra-red region of the spectrum. In some embodiments, as discussed, the eye tracker presented herein has the ability to synchronize 1-dimensional (1D) SBG with 1D (flexibility) of light source control and further with a highly asymmetrical detector layout. The implementation and activation of SBGs presented in this disclosure provide mix of user's eye-box locations and angle coordinates, which further provide for more relaxed eye-box accuracy requirements. The activation of SBG column(s) may vary spatially to provide for a given angle over the user's eye-box. The presented eye tracker has the ability to function accurately in AR, VR and MR systems.

Figure 6:
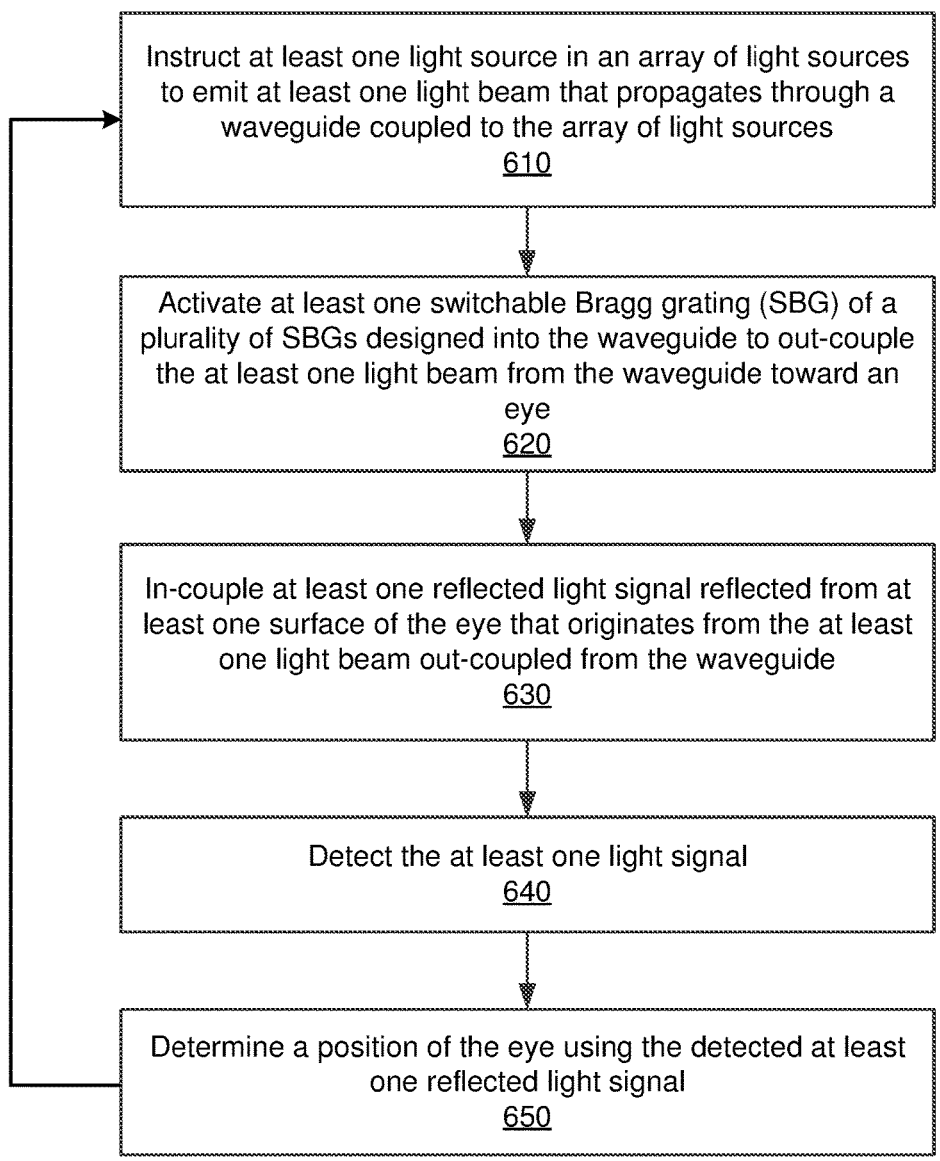
FIG. 6 is a flow chart illustrating a process for waveguide integrated eye tracking, in accordance with an embodiment.

FIG. 6 is a flow chart illustrating a process 600 for waveguide integrated eye tracking, in accordance with an embodiment. The process 600 of FIG. 6 may be performed by an eye tracker, e.g., the eye tracker 300 in FIG. 3. Other entities may perform some or all of the steps of the process in other embodiments. Likewise, embodiments may include different and/or additional steps, or perform the steps in different orders.

The eye tracker instructs 610 (e.g., via a controller) at least one light source in an array of light sources to emit at least one light beam that propagates through a waveguide coupled to the array of light sources. In some embodiments, light sources in the array of light sources can operate at different wavelengths and/or different modulations, e.g., based on emission instructions from the controller.

The eye tracker activates 620 (e.g., via the controller) at least one SBG of a plurality of SBGs designed into the waveguide to out-couple the at least one light beam from the waveguide toward an eye of a user. Each light beam emitted from a different light source of the array of light sources is out coupled from the waveguide at a different angle relative to an out-coupling location on the activated SBG. Each light beam emitted from a different light source of the array of light sources and out-coupled from the waveguide at the out-coupling location on the activated SBG illuminates a different spatial region of the eye, i.e., selection of one light source and activation of one SBG controlled by the controller illuminates a defined spatial region of the eye.

The eye tracker in-couples 630 (e.g., via the waveguide) at least one reflected light signal reflected from at least one surface of the eye that originates from the at least one light beam out-coupled from the waveguide. The at least one light beam coupled into the waveguide was previously out-coupled from the waveguide toward the eye, from a specific out-coupling location on the activated SBG and at a specific angle relative to the out-coupling location. Based on the out-coupling location and the out-coupling angle, the out-coupled light beam reaches a specific spatial region of the eye-box. Intensity (magnitude) of the light signal reflected from the at least one surface of the user's eye and captured by the eye tracker directly depends on a surface of the user's eye from which the light is reflected. In some embodiments, as discussed, a maximum level of intensity of the reflected light occurs when the eye (i.e., fovea) is looking directly at a location on the waveguide emitting the light.

The eye tracker detects 640 (e.g., via a detector) the at least one light signal. In some embodiments, over a plurality of time instants, the eye tracker detects a plurality of light signals reflected from various surfaces of the eye that were coupled into the waveguide and propagated through one or more return paths of the waveguide toward the detector. In an embodiment, the detector is coupled through a beam-splitter to the array of light sources. In some embodiments, the at least one reflected light signal is detected via the detector and filtered as appropriate, i.e., either temporally or spatially.

The eye tracker determines 650 (e.g., via the controller) a position of the eye using the detected at least one reflected light signal. In some embodiments, the eye tracker calculates position data based on the detected at least one reflected light signal. The eye tracker may compare the calculated position data with calibrated data that corresponds to an out-coupling location on the waveguide toward which the eye is looking directly, and determine the position of the eye based on the comparison. In some embodiments, the eye tracker calculates the position data by calculating at least one magnitude of the detected at least one reflected light signal. In alternate embodiments, the eye tracker calculates the position data by calculating at least one relative contrast of the detected at least one reflected light signal. In some embodiments, the eye tracker calculates position data based on each light signal of the detected at least one reflected light signal. Then, the eye tracker maps the calculated position data to a field location on the waveguide from which a corresponding light beams was out-coupled from the waveguide, and determines the position of the eye based on the mapping.

If specific position data (e.g., a maximum magnitude/contrast value) is not found among the calculated position data, a position (and orientation) of the user's eye is not yet determined. Then, the eye tracker instructs 610 at least one other light source to emit light, activates 620 at least one SBG column to out-couple the emitted light, and repeats operations 630, 640, 650, 660 until the specific position data is found, i.e., until the position of the user's eye is determined. In some embodiments, as a part of a startup process for each user, the eye tracker is calibrated to that user when the eye tracker first starts to learn 'the maximum magnitude value' and apparent contrast and filtering limits (e.g., 'the maximum contrast value'). During the startup process, the eye tracker determines the calibrated data for a particular user that corresponds to an out-coupling location on the waveguide toward which an eye of that user is looking directly.

For the embodiments when the light sources operate at different wavelengths and/or different modulations, interference of light beams reflected from at least one surface of the user's eye and coupled into the waveguide can be efficiently mitigated since different reflected light beams feature different wavelengths and/or modulations. Because of the mitigated interference between multiple reflected light beams that propagate through the waveguide and reach the detector, a maximum relative contrast/magnitude among the reflected light beams can be more accurately determined.

In some embodiments, the eye tracker instructs only a subset of light sources in the array of light sources to emit light beams and only a subset of the SBGs (e.g., only one SBG column), based on the previously determined position of the user's eye, since only a specific field region of the eye-box is illuminated by the light out-coupled from the waveguide. The eye tracker may be further configured to track the position of the user's eye based on other position data calculated based on other light signals reflected from the user's eye, wherein the other reflected light signals that originate from light beams emitted from the subset of light sources and out-coupled from the waveguide via the activated subset of the SBGs. The other reflected light signals are coupled into the waveguide and propagated to the detector of the eye tracker. In some embodiments, when the eye tracker is in an operational mode of searching for the user's eye-box and the eye, the eye tracker may instruct all or some other defined pattern of light sources in the array of light sources to emit light and activate particular SBG column(s) for out-coupling of the light such that to provide all combinations of the light sources emitting the light and the activated SBG columns.

In some embodiments, the eye tracker is integrated into a HMD to estimate position and orientation of a user's eye. The various applications of the HMD based on the estimated position and orientation of the user's eye include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, the HMD adjusts (e.g., via a varifocal module coupled to the controller) presentation of one or more images displayed at an electronic display of the HMD, based on the estimated position, orientation, and/or focus state of the eye. In an embodiment, the HMD performs (e.g., via the varifocal module) foveated rendering of the displayed images, based on the estimated orientation of the eye. Alternatively or additionally, the varifocal module can use information about the position and orientation of the user's eye obtained from the controller to adjust where objects are displayed to mitigate vergence-accommodation conflict. In some other embodiments, the eye tracker presented herein can be integrated into a HMD that does not include an internal display. Instead, the HMD can be interfaced with a remote display, such as an external monitor or TV. Alternatively or additionally, the HMD can be interfaced with an external audio device (e.g., speakers and/or headphones) that receives audio information from the HMD.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracker comprising:
   a waveguide;
   a plurality of switchable Bragg gratings (SBGs) configured to selectively out-couple light from the waveguide;
   an array of light sources coupled to the waveguide;
   a detector coupled to a return path of the waveguide; and
   a controller coupled to the SBGs, the array of light sources, and the detector, the controller configured to:
      instruct, in a first operational mode of the eye tracker, a subset of the light sources to emit light beams that propagate through the waveguide, activate, in the first operational mode, a subset of the
   SBGs to out-couple the light beams from different
   emission portions of the waveguide toward an eye,
activate, in the first operational mode, a position of
   the eye using light reflected from at least one surface
   of the eye and in-coupled by the waveguide,
instruct, in a second operational mode of the eye tracker
   based on the determined eye position, at least one
   light source in the array of light sources to emit at
   least one light beam that propagates through the
   waveguide, and
activate, in the second operational mode based on the
   determined eye position, at least one SBG of the
   plurality of SBGs to out-couple the at least one light
   beam from the waveguide toward the eye, wherein,
   in the second operational mode,
the waveguide in-couples at least one reflected light signal
   reflected from at least one surface of the eye that
   originates from the at least one light beam out-coupled
   from the waveguide,
the detector detects the at least one reflected light signal,
   and
the controller is further configured to determine an
   updated position of the eye using the detected at least
   one reflected light signal.

2. The eye tracker of claim 1, wherein the controller is further configured to:
calculate position data based on the detected at least one reflected light signal;
compare the calculated position data with calibrated data that corresponds to an out-coupling location on the waveguide toward which the eye is looking directly; and
determine the position of the eye based on the comparison.

3. The eye tracker of claim 2, wherein the controller calculates the position data by calculating at least one magnitude of the detected at least one reflected light signal.

4. The eye tracker of claim 2, wherein the controller calculates the position data by calculating at least one relative contrast of the detected at least one reflected light signal.

5. The eye tracker of claim 2, wherein the controller is further configured to:
instruct at least one other light source of the array of light sources to emit light, if the calculated position data do not match the calibrated data;
activate at least one other SBG of the plurality of SBGs to out-couple the emitted light;
calculate other position data based on one or more light beams reflected from one or more surfaces of the eye, coupled into the waveguide and captured by the detector; and
compare the other position data with the calibrated data.

6. The eye tracker of claim 1, wherein each light beam emitted from a different light source of the array of light sources is out-coupled from the waveguide at a different angle relative to an out-coupling location on the activated SBG and illuminates a different spatial region of the eye.

7. The eye tracker of claim 1, wherein the detector is further configured to:
capture, over a plurality of time instants, a plurality of light signals reflected from various surfaces of the eye that were coupled into the waveguide and propagated through one or more return paths of the waveguide toward the detector.

8. The eye tracker of claim 1, wherein the detector is coupled through a beam-splitter to the array of light sources.

9. The eye tracker of claim 1, wherein the controller is further configured to:
determine, during a startup process for each user, calibrated data for that user.

10. The eye tracker of claim 1, wherein the controller is further configured to:
calculate position data based on each light signal of the detected at least one reflected light signal;
map the calculated position data to a field location on the waveguide from which a corresponding light beam was out-coupled from the waveguide; and
determine the position of the eye based on the mapping.

11. The eye tracker of claim 1, wherein light sources in the array of light sources operate at different wavelengths or different modulations.

12. The eye tracker of claim 1, wherein the controller is further configured to:
instruct, at each time instant of a plurality of time instants, a defined pattern of light sources in the array of light sources to emit light and activate one or more SBGs of the plurality of SBGs for out-coupling of the light to provide pre-determined combinations of the light sources emitting the light and the activated SBGs for the plurality of time instants.

13. A method comprising:
instructing a subset of light sources in an array of light sources to emit light beams that propagate through a waveguide coupled to the array of light sources;
activating a subset of switchable Bragg grating (SBGs) of a plurality of SBGs to out-couple the light beams from different emission portions of the waveguide toward an eye;
determining a position of the eye using light reflected from at least one surface of the eye and in-coupled by the waveguide;
instructing, based on the determined eye position, at least one light source in the array of light sources to emit at least one light beam that propagates through the waveguide;
activating, based on the determined eye position, at least one SBG of the plurality of SBGs to out-couple the at least one light beam from at least one emission portion of the waveguide toward the eye;
in-coupling at least one reflected light signal reflected from at least one surface of the eye that originates from the at least one light beam out-coupled from the waveguide;
detecting the at least one reflected light signal; and
determining an updated position of the eye using the detected at least one reflected light signal.

14. The method of claim 13, further comprising:
calculating position data based on the detected at least one reflected light signal;
comparing the calculated position data with calibrated data that corresponds to an out-coupling location on the waveguide toward which the eye is looking directly; and
determining the position of the eye based on the comparison.

15. The method of claim 14, further comprising:
instructing at least one other light source of the array of light sources to emit light, if the calculated position data do not match the calibrated data;
activating at least one other SBG of the plurality of SBGs to out-couple the emitted light;

calculating other position data based on one or more light beams reflected from one or more surfaces of the eye and coupled into the waveguide; and comparing the other position data with the calibrated data.

16. The method of claim 13, further comprising:

calculating position data based on each light signal of the detected at least one reflected light signal;

mapping the calculated position data to a field location on the waveguide from which a corresponding light beams was out-coupled from the waveguide; and determining the position of the eye based on the mapping.

17. The method of claim 13, further comprising:

instructing, at each time instant of a plurality of time instants, a defined pattern of light sources in the array of light sources to emit light and activate one or more SBGs of the plurality of SBGs for out-coupling of the light to provide pre-determined combinations of the light sources emitting the light and the activated SBGs for the plurality of time instants.

18. A head-mounted display (HMD) comprising:

a display configured to emit image light;

an optical assembly that provides optical correction to the image light;

a waveguide;

a plurality of switchable Bragg gratings (SBGs) configured to selectively out-couple light from the waveguide;

an array of light sources coupled to the waveguide;

a detector coupled to a return path of the waveguide; and a controller coupled to the SBGs, the array of light sources, and the detector, the controller configured to:

instruct, in a first operational mode of the eye tracker, a subset of the light sources to emit light beams that propagate through the waveguide, activate, in the first operational mode, a subset of the SBGs to out-couple the light beams from different emission portions of the waveguide toward an eye, determine, in the first operational mode, a position of the eye using light reflected from at least one surface of the eye and in-coupled by the waveguide, instruct, in a second operational mode of the eye tracker based on the determined eye position, at least one light source in the array of light sources to emit at least one light beam that propagates through the waveguide, and activate, in the second operational mode based on the determined eye position, at least one SBG of the plurality of SBGs to out-couple the at least one light beam from the waveguide toward the eye, wherein, in the second operational mode, the waveguide in-couples at least one reflected light signal reflected from at least one surface of the eye that originates from the at least one light beam out-coupled from the waveguide, the detector detects the at least one reflected light signal, and the controller is further configured to determine an updated position of the eye using the detected at least one reflected light signal.

19. The HMD of claim 18, further comprising:

a varifocal module configured to adjust focus of one or more images displayed on the display, based at least in part on the updated position of the eye.

* * * * *

UNITED STATES PATENT AND TRADEMARK OFFICE
CERTIFICATE OF CORRECTION

PATENT NO. : 10,268,268 B1
APPLICATION NO. : 15/639565
DATED : April 23, 2019
INVENTOR(S) : Nicholas Daniel Trail Page 1 of 1

It is certified that error appears in the above-identified patent and that said Letters Patent is hereby corrected as shown below:

In the Claims

Column 23, Lines 9-10, Claim 16, delete "from which a corresponding beams was out-coupled" and insert -- from which a corresponding beam was out-coupled --.

Signed and Sealed this
Eighth Day of October, 2019

Andrei Iancu
*Director of the United States Patent and Trademark Office*